United States Patent
Steinich (10) Patent No.: US 7,855,552 B2
(45) Date of Patent: Dec. 21, 2010

(54) ROTATION ANGLE SENSOR

(75) Inventor: Klaus Manfred Steinich, Zorneding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 469 days.

(21) Appl. No.: 11/646,885

(22) Filed: Dec. 28, 2006

(65) Prior Publication Data
US 2007/0151322 A1 Jul. 5, 2007

(30) Foreign Application Priority Data
Dec. 30, 2005 (DE) .................. 10 2005 063 071
Dec. 20, 2006 (DE) .................. 10 2006 060 213

(51) Int. Cl.
*G01B 7/30* (2006.01)

(52) U.S. Cl. .................. 324/207.25; 33/1 PT (58) Field of Classification Search .......... 324/160, 324/173, 174, 179, 207.2, 207.21, 207.22, 324/207.25; 73/514.39; 335/78, 80, 84, 335/85, 177, 205, 207
See application file for complete search history.

(56) References Cited

U.S. PATENT DOCUMENTS

| | | | | |
|---|---|---|---|---|
| 2,804,515 A * | 8/1957 | Heggen | .................. | 200/61.46 |
| 4,275,291 A | 6/1981 | Feller | | |
| 5,365,785 A | 11/1994 | Martin | | |
| 5,922,953 A * | 7/1999 | Payne et al. | .................... | 73/494 |
| 6,154,975 A * | 12/2000 | Steinich | ..................... | 33/756 |
| 6,326,781 B1 * | 12/2001 | Kunde et al. | ........... | 324/207.21 |
| 6,568,092 B1 * | 5/2003 | Brien | ..................... | 33/1 PT |
| 7,215,115 B2 * | 5/2007 | Saito et al. | ............. | 324/207.25 |

FOREIGN PATENT DOCUMENTS

| | | |
|---|---|---|
| DE | 2608953 A1 | 3/1976 |
| DE | 2833349 A1 | 6/1978 |
| DE | 4030229 A1 | 9/1990 |

\* cited by examiner

*Primary Examiner*—Kenneth J Whittington
(74) *Attorney, Agent, or Firm*—Head, Johnson & Kachigian, P.C.

(57) ABSTRACT

A rotation angle sensor is provided for determining mechanical angular positions and transposing them into signals transferable through electricity. The sensor includes a housing (2), a rotation indicator (4) located outside of the sensor housing (2a) so that it can rotate and coupled with the sensor element (3) so it operates in a non-contracting manner through the wall of the housing (2). A sensor element (3) is located in the interior of the housing (2). An intermediary element (5) is rotationally supported in the interior of the housing (2) between the sensor element (3) and the rotation indicator (4) and coupled to the rotation indicator (4) in a rotationally fixed, but non-contacting manner.

34 Claims, 12 Drawing Sheets

ROTATION ANGLE SENSOR

CROSS-REFERENCES TO RELATED APPLICATIONS

This application claims priority to Germany Patent Application Nos. 102005063071.4 filed 30 Dec. 2005 and 102006060213.7 filed 20 Dec. 2006.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention regards rotation angle sensors for determining mechanical angular positions and transposing them into signals transferable through electricity.

Such rotation angle sensors are known in various designs, operating through induction, magnetism, or opto-electronics.

Thereby, the mechanical rotational positions of functional elements relative to the rotation angle sensor are detected and provided as electrical signals to an electric or electronic processing- and/or control unit.

In particular, when such rotational angle sensors have to be used in rough operating conditions, the weak spot of such sensors is the rotational guidance or the rotating bearing of the rotation indicator which has to be mechanically coupled to the functional element. The rotational position of the functional element is to be detected and has to operate in a defined relative position with respect to the sensor element.

Through contamination, corrosion or other physical or chemical influences the rotation of the indicator can be impeded, slowed down or prevented completely and, thereby, can cause failure of the entire rotational angle sensor. The sensor element can also get damaged if it is subjected to rough environmental conditions.

For this reason, it was attempted to provide angle sensors in which at least the sensor element itself is isolated from rough environmental conditions and housed in a tight, encapsulated housing. The rotational indicator for the sensor element, which is rotationally fixated to the component to be monitored, is located and supported outside the housing and is rotationally coupled to it in a non-contacting manner, e.g. through magnetism or induction.

For this purpose, it is already known to support an indicator shaft in a protrusion of the housing in a rotationally fixed manner outside of the enclosed housing itself, in whose interior the sensor element is located. The indicator shaft has an indicator magnet at its end facing the sensor element, located in the housing, which has alternating varied magnetization along its circumference.

The other end of the indicator shaft is coupled with a clutch to the component of which the rotational position is to be detected.

Also, the housing section, in which the indicator bearings are located, is enclosed. However, the indicator shaft has to be run through a closing side which does not allow for a complete and durable seal under rough operating conditions.

In order to generate a precise signal, it is necessary to support the indicator magnet in an exactly defined position relative to the sensor element.

Instead of being mounted to a shaft separately supported in a housing of the sensor, with the above-mentioned design, variants are possible in which the rotatable indicator magnet is directly mounted to the component with a rotational position to be detected.

Thereby, it is almost impossible to realize an exact axle alignment and the correct distance in axial direction between the rotating indicator magnet and the sensor element, when mounting the rotation angle sensor, which deteriorates the quality, thus the precision of the signal generated.

However, the loss of quality caused by this also depends on the operating principle (opto-electronic, inductive, magnetostrictive) of the sensor element, and also on the question of whether it is a self rotatable sensor element or a sensor element supported in the housing in a rotationally fixed manner. However, an imprecise alignment of sensor and sensor element is always disadvantageous with respect to the quality of the signal generation.

BRIEF SUMMARY OF THE INVENTION

Therefore, it is the object of the invention to provide a rotation angle sensor that is located in an enclosed housing without rotating pass through, still delivering a high quality signal.

Through the location of an additional intermediary element within a protected housing an additional component is required; however, through its precise bearings, within the housing like the sensor element, it is assured on the one hand, that both components are not in an area influenced by rough environmental conditions and that an exact geometric alignment of the two components relative to each other is preformed with respect to their axial distance and also with respect to the alignment of their rotational axes. This results in a very high transfer precision of rotation of an intermediary element into an electrically processable signal.

A non-contacting coupling of the rotation indicator, in particular of a magnetic rotational indicator, through a wall of the housing to the intermediary element, allows for offsets of the rotational axes to a large extent, and also angular errors of the rotational axis relative to each other, and also incorrect axial spacing of the rotation indicator and the intermediary element.

Therefore, the rotation indicator, e.g. provided as a magnetic rotation indicator, can be fixed directly to a rotating component to be detected; and the housing of the rotation angle sensor can be positioned sufficiently precise relative to it.

Another advantage is that the intermediary element and the sensor element are located within the housing and that there is a choice to couple both in a non-contacting manner or if the sensor element is a sensor element that performs joint rotation, in a mechanical manner. Since with a mechanical coupling this does not require a rotational pass through, through a housing wall, or similar.

Since the rotation indicator does only interfere with the intermediary element and not directly with the sensor element, a direct influence of the rotation indicator onto the sensor element and, thereby, an imprecise signal generation are reliably avoided.

If the sensor element itself does not rotate, no rotating bearings are required for it and such a sensor element can be very precisely fixed in the housing.

In particular, when such a sensor element as an electronic component is provided as an integral sensor element, the entire integral sensor element is mounted in the housing in a defined and solid manner. The entire integral sensor element may include a printed circuit board carrying the sensor element. Thereby, the entire integral sensor element is located in a durable, exactly defined spatially fixed relative to the intermediary element. If the sensor element or a part of the sensor element has to be rotatably supported in the housing, it can, especially when the rotation is to be performed analog to the rotation of the intermediary element, also be coupled in rotationally fixed manner with the intermediary element, and in particular without a separate support of its own, be located on the intermediary element which is sufficiently supported by itself.

The rotation indicator and the intermediary element can also use different non-contacting processes, such as induction, magnetism, or electromagnetic radiation, wherein subsequently magnetism is used in an exemplary manner.

With the magnetic functional principle, the elements generating the magnetic field lines are located such that they generate field lines located in a plane which includes the rotational axis, and preferably, the field lines extend symmetrical to the rotational axis. The field lines then rotate together with the field generating elements around the rotational axis when the rotation indicator or the intermediary elements rotate.

On the other hand, the magnetostrictive sensor is designed so that several magnetostrictive sensor elements are located around the rotational axis, that is, symmetrical relative to the rotational axis, opposing each other in order to detect these field lines.

In order to be able also to detect the direction of rotation besides the speed of rotation, it is known to use such sensor elements in pairs in order to have them operate offset relative to each other by a defined phase angle.

Another solution can be to provide, in particular, the field lines generated by the intermediary element not symmetrical to the rotational axis, but non symmetrical to it, through which the detection of the direction of rotation only through one sensor element, which is equipped with several magnetostrictive sensor elements, is possible.

Since an exact rotation and, thus, support of the intermediary element is important for high signal quality, the intermediary element is rotationally supported, in particular, at its outer circumference, and thereby directly at a wall of the housing which is located between the intermediary element and the rotation indicator. In a round, in particular, pot-shaped housing this is in particular the one face wall, with a pot-shaped housing the bottom of the pot, which then has to be provided thin in order to reliably keep the chemical and physical environmental conditions out of the housing and, on the other hand, to impede the non-contacting coupling of the rotation indicator and intermediary element through this wall by as little as possible.

The opened side of the pot-shaped housing is then the side facing away from the rotation indicator. The pot-shaped housing is closed by a cover after mounting the components in the interior of the housing either by a threaded and sealed cover or by an inserted cover which is fixed by a snap ring and sealed.

In the interior of the housing, the sensor element is positioned as exact as possible relative to an end of the intermediary element pointing towards it, e.g. by positioning the printed circuit board, where the sensor element and typically the entire processing electronics are located, in a defined position in the housing, e.g. a solid shoulder in the interior circumference of the housing and fixed there.

Thereby, the functional elements, e.g. the magnets, of the intermediary element are located on its entry side with an effective circle as large as possible in order to make torque transferred by them as high as possible. The intermediary element itself is supported in the housing with as little friction as possible, in particular, through roller bearings. On the other hand, the operating elements on the output side of the intermediary element can be located on a comparatively small diameter, thus, adapted to the effective diameter of the sensor element.

The non-contacting functional connection through magnetism between the rotation indicator and the intermediary element, also through a housing wall if this is made from a material that cannot be magnetized, is achieved by at least the rotation indicator or the input side of the intermediary element being magnetized in a variable alternating manner so that during rotation they can transfer torque to the coupled component or receive torque from it.

For this, either a magnetization is necessary which varies and alternates along the circumference of the component, this means, a pole direction extending in circumferential direction or single mostly stick-shaped magnets 24 radially disposed with a radial pole direction, whereby also a non-symmetric magnetic field in circumferential direction is created.

The respective other component which substantially rotates around the same rotational axis, either only comprises a ferrite mass, which is disposed in a non-symmetric manner relative to the rotation axis, or also one or several magnets, in case of radial pole direction of the magnets, with a pole direction rotated by 180°, so that a north pole of one component is located opposite to a south pole of the other component and is taken along by it.

Thereby, it is not important if the functional component of the rotation indicator is axially or radially opposed to an input side of the intermediary element as long as the distance between both is small enough so that the magnetic coupling and the transfer of torque is possible in a sufficient manner.

For this purpose, the housing wall located in between has to be made from a non-magnetic material at least in this intermediary area.

However, some kind of mechanical barrier will be always present between both, since it is intended that the intermediary element as well as the sensor element impacted by the intermediary element are located in a tight, enclosing protective housing through which no mechanical rotation pass-through to the rotational generator have to be provided, which are difficult to seal.

The intermediary element is thereby supported in the interior of the housing with as little bearing friction as possible, in particular static friction, either with the larger one of the output side or input side of the intermediary element or on a special bearing diameter which is then mostly axially located between the output side and input side and can be also smaller than their diameter.

Thereby, a circle is defined as the functional circle of the effective elements, this means ferrite mass or magnet, which is defined, when rotating the intermediary element or the rotation generator, by the center between both poles of the magnet or by the middle of the far outside and the far inside radial point of the ferrite mass.

If an entry side of the intermediary element or the rotation generator has one functional element, this functional element can be either completely located on one side of the rotational axis or it can extend beyond the rotational axis, but to the largest extent it will be positioned on one side of the rotational axis and thereby non-symmetrical relative to the rotational axis.

Instead of single radially extending stick magnets, annular magnets are also possible that extend concentric with the rotational axis.

Support of an intermediary element in the housing can be performed conventionally, that is, through a mechanical bearing, either a roller bearing or a straight bearing.

However, other bearings are possible for reducing the static friction in the bearing, in particular fluidic bearings.

An option is that the chamber in which an intermediary element is located and sealed, in particular, relative to the space in which is located the sensor element, is partially filled with a fluid and the intermediary element is provided as a float, floating in the fluid, whereby the pivoting axis is transverse, in particular, perpendicular to the fluid level.

Preferably, a pole axis of the float is thereby parallel to the fluid level and the fluid level is horizontal in particular.

Thereby, in order for the intermediary element to take a defined position within the housing, it is only provided minimally smaller than the cavity in the chamber of the housing in which it floats. This chamber has a cross section parallel to the fluid level, which is preferably circular, which is almost completely filled by the stick or disk-shaped float.

In order to further minimize the friction forces between the float and the inside of the housing when contact occurs, the float at its outside, in particular at its outer edges, is provided with protrusions or knobs with a small surface which then form the sole and, thereby, small contact surfaces with respect to the housing.

Another kind of fluidic bearing is a ferro-fluidic bearing in which at the location of the bearing either the outer surface of the part to be supported, in this case, of the intermediary element or the inside surface of the supporting bearing block is provided magnetic.

In the bearing gap, a ferro-fluid is provided in a thin layer in which particles which can be magnetized, mostly fine particles which can be magnetized, are located, which are attracted by the holding magnet of the bearing block of the component to be supported and, therefore, hold the ferro-fluid in the bearing gap. Consequently, only a very small amount of ferro-fluid is necessary.

The amount is adjusted so that only the volume of the bearing gap is filled with it, and hardly any ferro-fluid is located outside of the bearing slot.

Axial and also radial bearings can be realized with ferro-fluid.

In order to be able to adjust a zero position during mounting of the sensor, the housing on the one hand carries a zero position marker on its outside, as well as the indicator element.

In spite of all precautionary measures, the intermediary element is partially stuck in the housing and cannot rotate freely. In order to avoid that the non-contacting but rotationally fixed indicator elements and the intermediary element change rotation positions relative to each other, zero position markers should be provided which are always in alignment with each other and, thus, have to be in the same rotational position as the respective other marker. The zero position marks should be provided at the intermediary element, on the one hand, and at the indicator, on the other hand. A sight window is required in the housing in order to be able to recognize the marker of the indicator housed therein.

For mounting the rotation angle sensor at a component in a vicinity, the housing is provided at its outer circumference with one or several slots on at least two opposing sides, in case of a round circumference, preferably annular circumferential, which can be used for applying mounting elements.

Electrical signals generated by the rotation angle sensor are transferred to the outside either in a conventional manner via a cable which runs through the housing, preferably through the cover of the housing through a cable grommet, or through a cable socket installed tight in the housing or in the cover.

The other possibility is to transmit the signals to the outside in a non-contacting manner, wherein then preferably as a functional principle another functional principle is used, than for coupling the rotation indicator and intermediary element, or the intermediary element and the sensor element, in order to avoid interferences. Preferably, the side of the housing facing away from the rotation angle indicator sensor is passed through by the signals in a non-contacting manner.

In the case with a conventional cable exit, a radial cable exit is necessary and it is either radially run out directly, radially from a side surface of the housing or a special cover or cover adapter is used, which in spite of the axial exit from the cover, runs the cable radially across the rim of the cover through angulating the cable through the adapter. Thereby, the same housing can be used for both cable exit directions, possibly even the same cover and only one additional cable adapter is required.

BRIEF DESCRIPTION OF THE DRAWINGS

Embodiments according to the invention are subsequently described in more detail.

DETAILED DESCRIPTION OF THE INVENTION

A rotation angle sensor is located, as can be seen in FIG. 1, in an interior of a pot-shaped housing 2 having a very thin frontal wall 2' as a bottom of the pot. Housing 2 is completed through a cover 7 which abuts to an interior circumference of a wall of housing 2 through an O-ring 13 as a seal, and which is secured in it in axial direction through a snap ring 12.

Directly at an inside of thin frontal wall 2' a round intermediary element 5 is rotatably supported with its outer circumference in an annular bearing 14 inserted into an inside of thin frontal wall 2', wherein an intermediary element 5 at least comprises a permanent magnet having at least two different poles being arranged behind each other in circumferential direction, and are preferably provided on the front face of an intermediary element pointing toward the interior of the housing, and also on the opposing front face of the intermediary element.

On a rotational axis 17 of intermediary element 5, which is also an axial direction of housing 2 which is also round, a sensor element 3 shaped as an integral sensor element 6 is located on a printed circuit board 8, perpendicular to rotational axis 17.

Printed circuit board 8 is fixed in its location relative to housing 2. Sensor element 3 is thereby moved as close as possible axially to intermediary element 5, in particular, directly to the front face of a bearing 14. In the middle of a cover 7 a regular connector socket 16, made from two parts is threaded in a solid and tight manner in a pass-through opening of cover 7, which is connected via electrical conductors (not shown) to the processing electronics for further conduction of the electrical signals generated.

Rotation indicator 4 is located outside of housing 2 close to thin front wall 2' where intermediary element 5 is located in the interior of the housing and is placed onto component 15 with its front face whose rotation is to be detected.

Thereby, rotation angle sensor 1 is moved as close as possible to rotating component 15 and fixed so that rotation indicator 4 mounted to component 15 is also located in approximate alignment on rotation axis 17 of intermediary element 5 and is located at a small distance to front face 2' of housing 2.

Figure 1A:
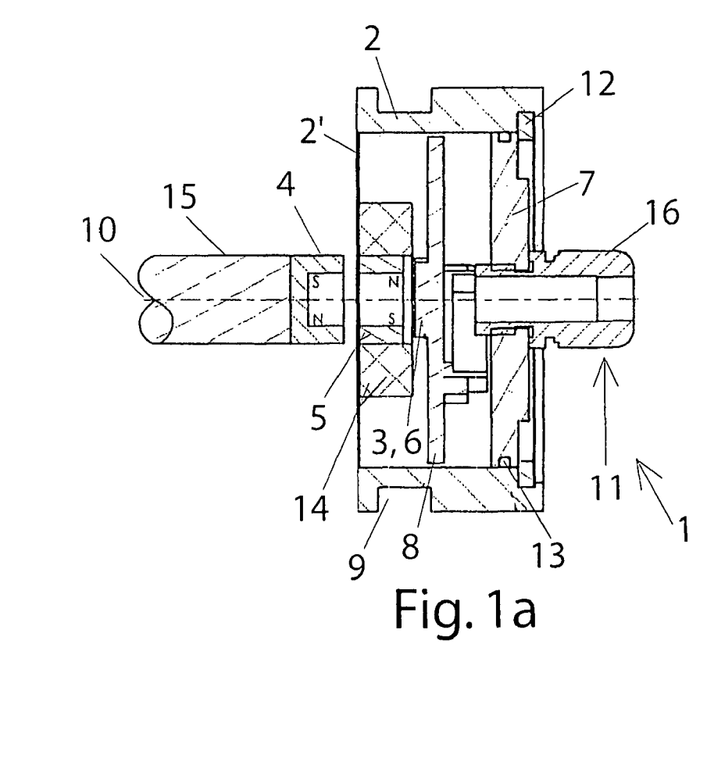
FIGS. 1a and b show a longitudinal sectional view and an axial top view of a first rotation angle sensor.
Figure 1B:
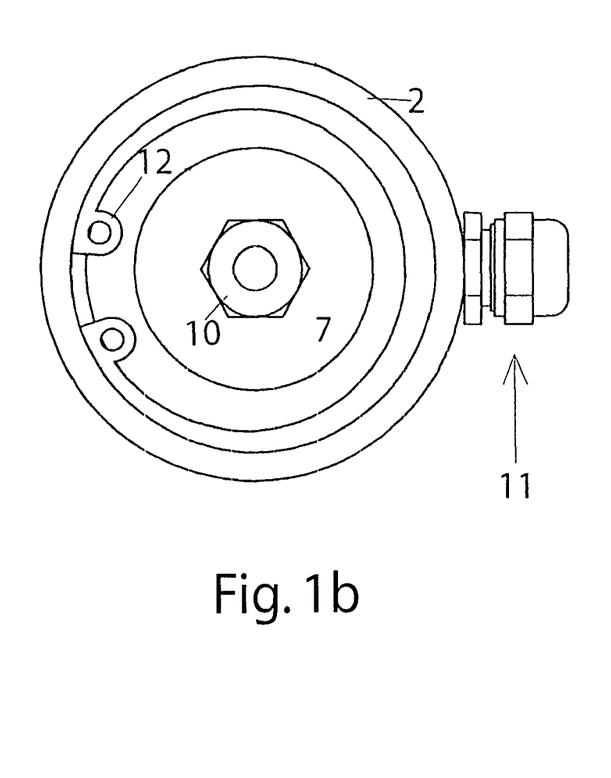

In FIG. 1b, as an alternative to the central axial cable exit through cover 7, is shown a radial cable exit from the side wall of housing 2, again with a two piece connector socket threaded into a respective pass-through opening.

FIG. 1a furthermore shows an annular circumferential groove 9 in an outer circumference in the side walls of housing 2 for attaching tension brackets or other mounting elements for fixing rotation angle sensor 1 at a component 15 of the environment.

Figure 2A:
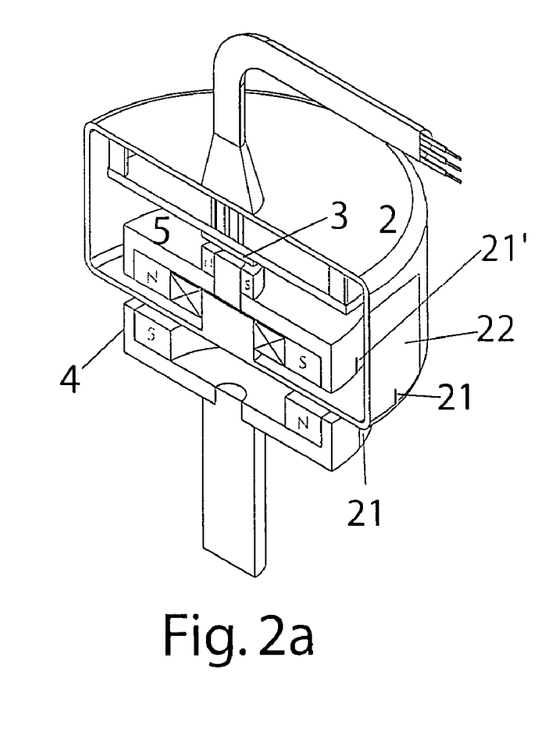
FIGS. 2a through 2d show a second embodiment of an angle sensor.

The FIG. 2 show an embodiment of the rotation angle sensor which is different from the one of FIG. 4, in particular through the design of rotation indicator 4 and intermediary element 5.

Intermediary element 5 is provided on an entry side 18 and on an exit side 19 with different magnetic sections 20a, b not reaching axially from one side to the other. These are located on exit side 19 toward a sensor element 3 on a relatively small effective circle corresponding to the diameter of sensor element 3, on the other hand, on entry side 18, associated with rotation indicator 4, on a much larger, 2 to 3 times larger effective circle. Also, magnetic sections 20a,b of rotation indicator 4, which are analogously located, are located on the same large effective circle, wherein certainly in the same rotating position of entry side 18 of intermediary element 5 and rotation indicator 4, a south pole and a north pole each oppose each other, through their attraction the non-contacting but rotationally fixed coupling is performed.

Through the large diameter of the effective circle, at the same magnetic intensity, a much larger torque is transferred so that intermediary element 5 is reliably rotated by rotation indicator 4, while the magnetic force development between exit side 19 of intermediary element 5 and the sensor element is much smaller.

Accordingly, the support of intermediary element 5 is not performed close to the other circumference, but radially inside the magnetized sections, preferably with roller bearings, in order to keep the friction as low as possible.

Figures 2B, 2C, 2D:
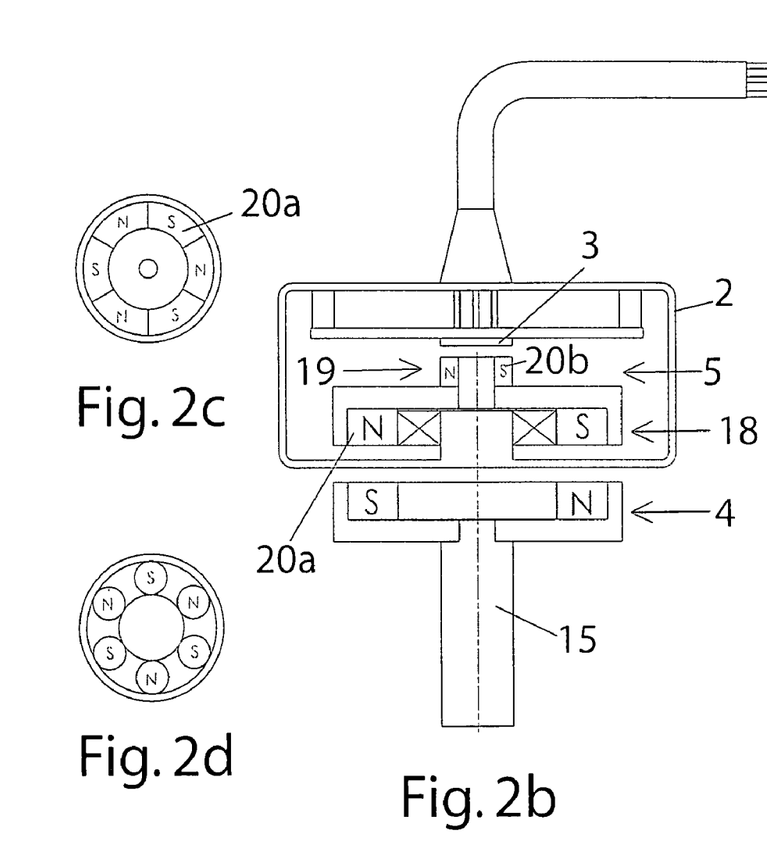

FIG. 2c shows that magnetized areas 20a, b can constitute the segments of a circle or circular ring, or as FIG. 2d shows single round magnets which can be located along the circumference of rotation indicator 4 and/or entry side 18 of intermediary element 5.

Figure 3A:
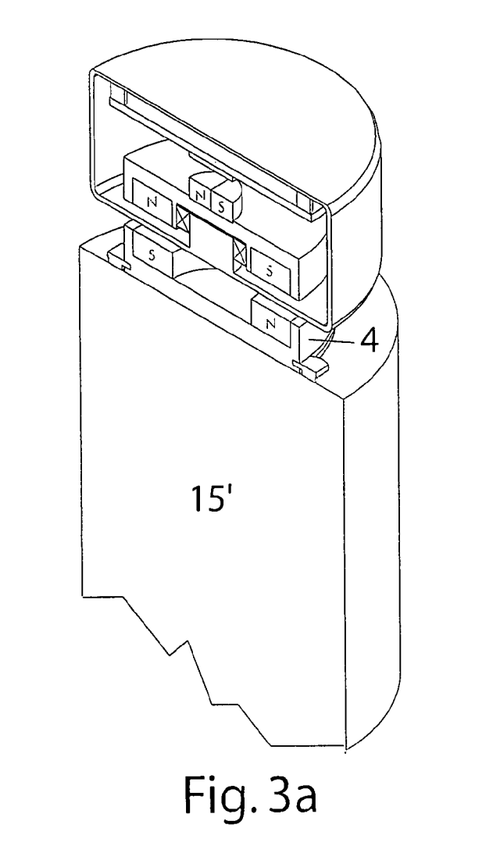
FIGS. 3a through 3c show yet another embodiment of the present invention.
Figure 3B:
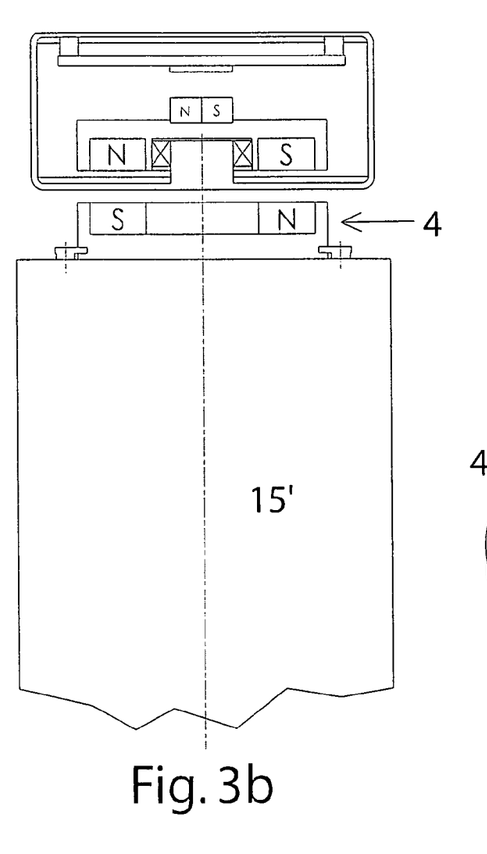
Figure 3C:
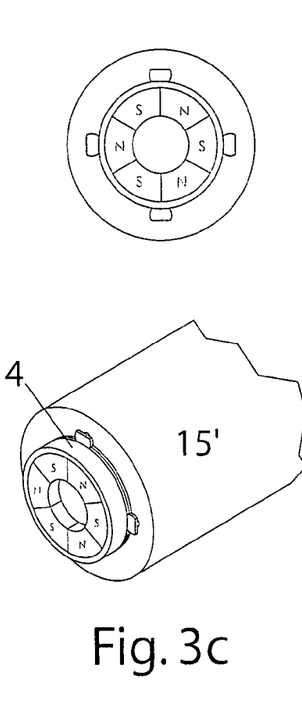

While in FIG. 2 rotation indicator 4 is located on a pinion-shaped central protrusion of component 15 to be detected, in FIG. 3 the location of rotation indicator 4 on the front face of a larger diameter component 15' is shown.

Thereby, annular rotation indicator 4 is located on the front face of component 15 to be detected in a rotationally fixed manner through tension brackets reaching into a circumferential groove.

Furthermore, FIG. 2 shows on the outside of housing 2 and on rotation indicator 4 the markings 21. Markings 21 have to match in the same rotation position if the rotation angle sensor is to indicate a zero position. Since without the influence of a rotation indicator 4, intermediary element 5 adjusts to a certain zero position through the force of sensor element 3, though it is small.

Additionally, preferably, on intermediary element 5 a marker 21' can be provided which also always has to correspond to a respective marker 21' on rotation indicator 4 in its rotation position. Wherein on rotation indicator 4, markers 21 and 21' can be provided as a single marker.

Since marker 21' of intermediary element 5 is located in an interior of housing 2, then at least at one location of the circumference a side window 22 must be provided in the housing 2.

Thereby, it can be assured that no undesired relative rotation between intermediary element 5 and rotation indicator 4 has occurred.

While the solutions of FIGS. 1 through 3 are rather suited for magnetizing rotation indicator 4, or the input side of intermediary element 5 in which the pole direction extends in circumferential direction, the following Figures show solutions in which, rather, but not exclusively, stick magnets can be used having pole axes extending diametrically.

Thereby, rotation indicator 4 moves input side 18 of intermediary element 5 along in circumferential direction, due to a magnetic coupling, for which one of both above mentioned components comprises a magnet, and the other either comprises a ferrite mass or, on the other hand, at least one magnet. In between, a wall made from material that cannot be magnetized extends so that intermediary element 18 and the sensor element can be located in a tight protective housing.

The rotation indicator 4 thereby rotates around the same or an approximately coinciding rotation axis 17, as the intermediary element 5.

In the solutions of FIG. 4, the functional element, that is, magnet 24 or the ferrite mass 23, rotates in the radial plane of the functional element of input side 18 of intermediary element 5 so that it rotates around housing 2 on the outside at this axial position.

Figure 4A:
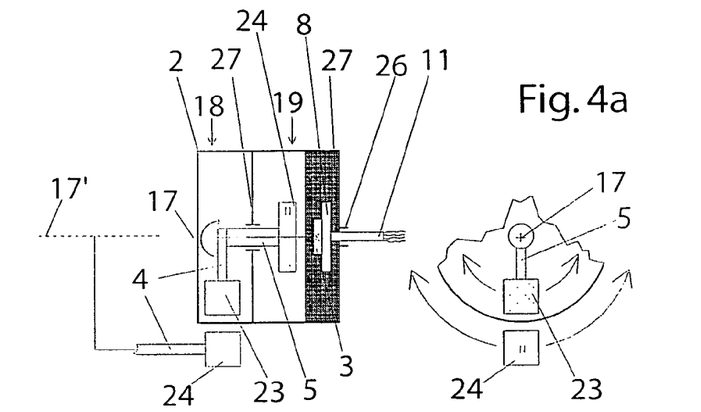
FIGS. 4a through 4f show embodiments in which a rotation indicator rotates around a radial outside of an intermediary element.

In FIG. 4a, a ferrite mass 23 is located for this purpose, reaching out on one side from rotational axis 17 of intermediary element 5 on its input side 18, while radially outside of this and outside of housing 2 at the same axial position and as close as possible to housing 2, rotation indicator 4 comprises a stick magnet 24 whose pole direction is either parallel (FIG. 4a, FIG. 4f) or laterally extending (FIG. 4c, FIG. 4e) relative to rotational axis 17' of rotation indicator 4.

Figure 4B:
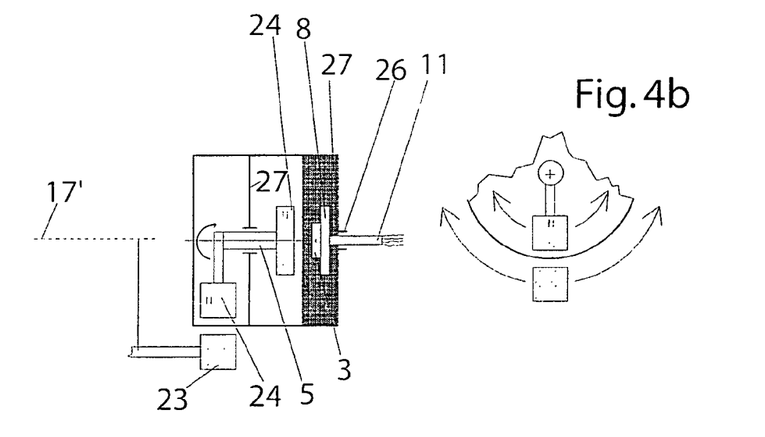
Figure 4C:
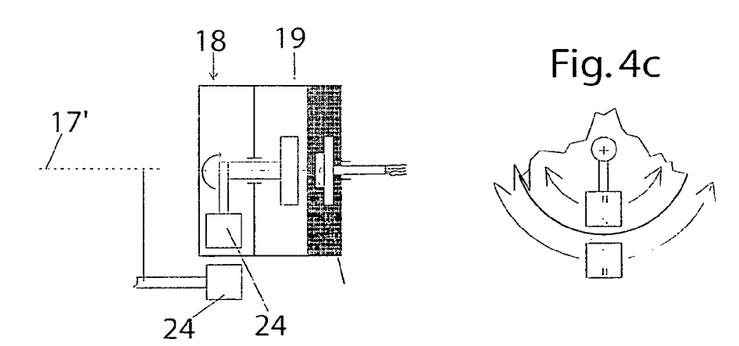

In FIG. 4b, on the other hand, the functional element on the side of the rotation indicator 23 is a ferrite mass, while a stick magnet 24 with its pole direction radially extending relative to the rotation axis 17 and eccentric to it, is located as a functional element on entry side 18 of intermediary element 5.

Figure 4D:
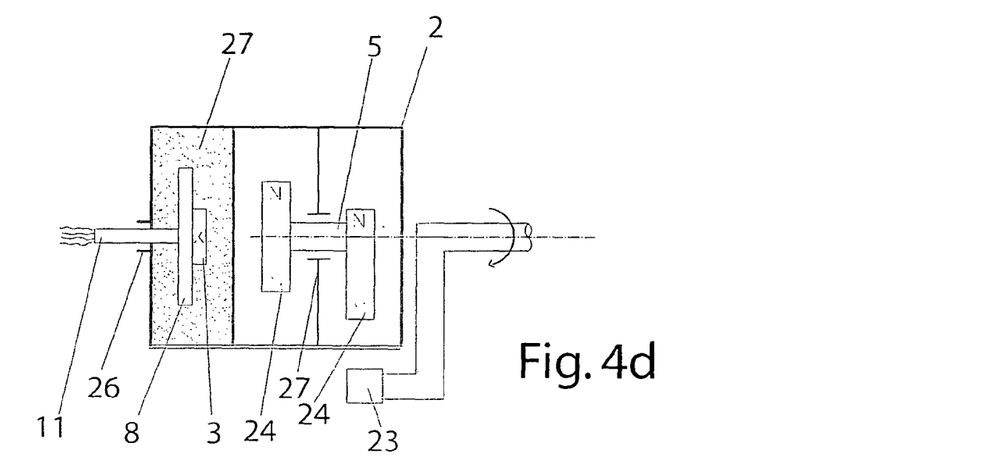
Figure 4E:
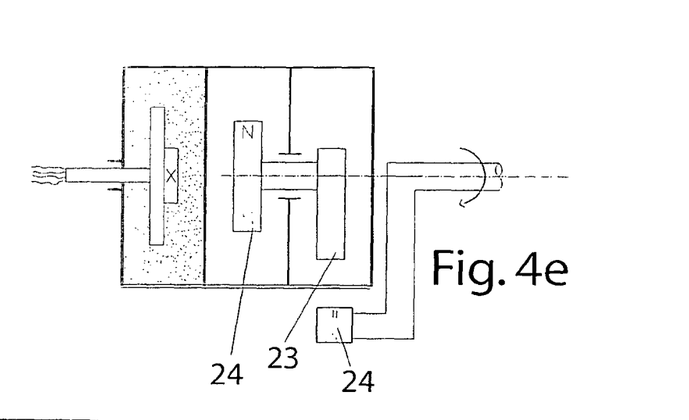
Figure 4F:
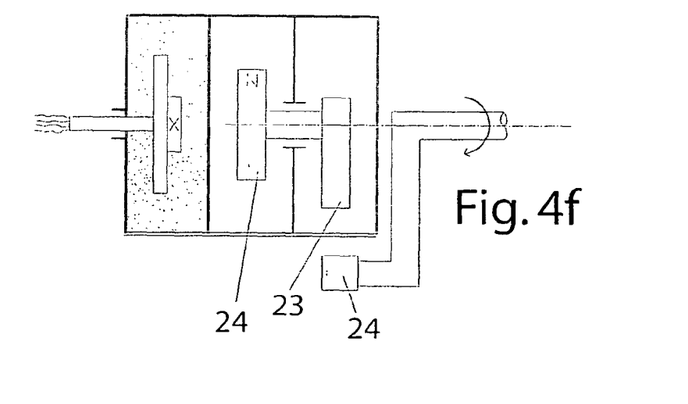

While stick magnet 24 is located completely on one side of rotational axis 17 in FIG. 4b, the pole direction in FIG. 4d is disposed so it extends across the rotational axis, however, not symmetrical to it.

Figure 5A:
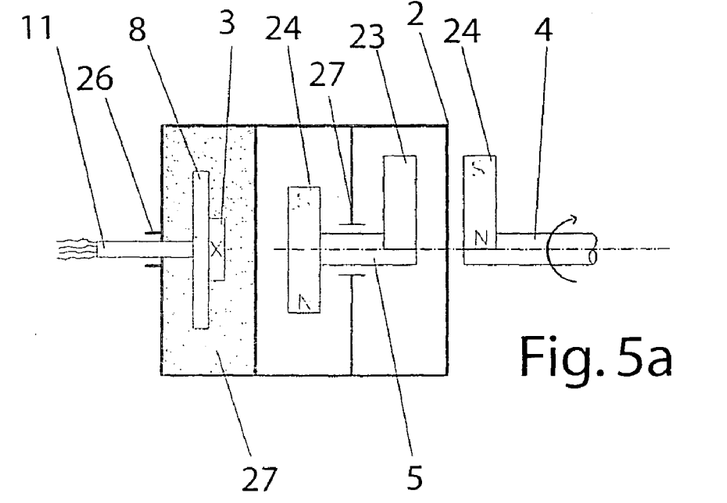
FIGS. 5a through 5f show solutions in which a rotation indicator is opposed to a front face of an intermediary element.
Figure 5B:
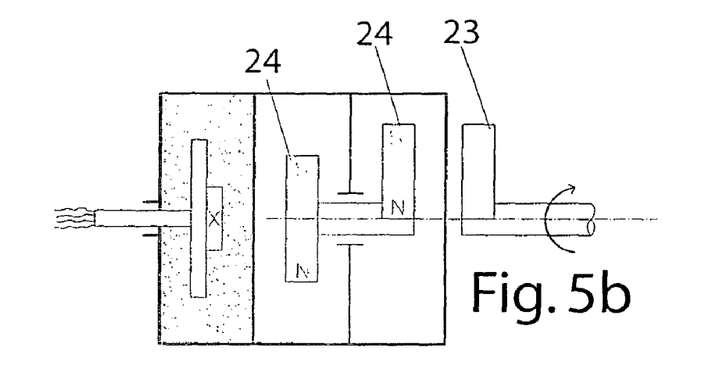
Figure 5C:
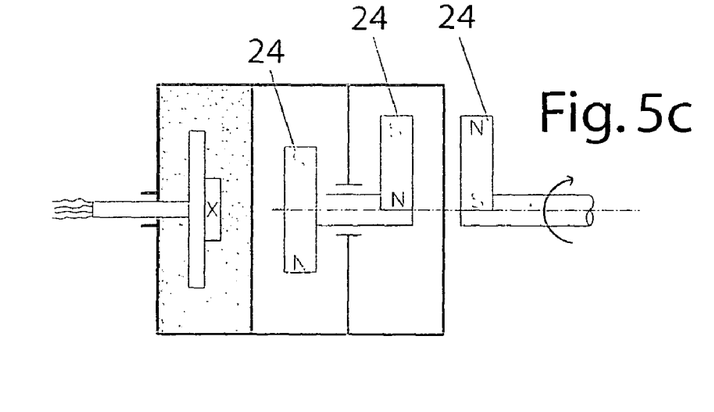
Figure 5D:
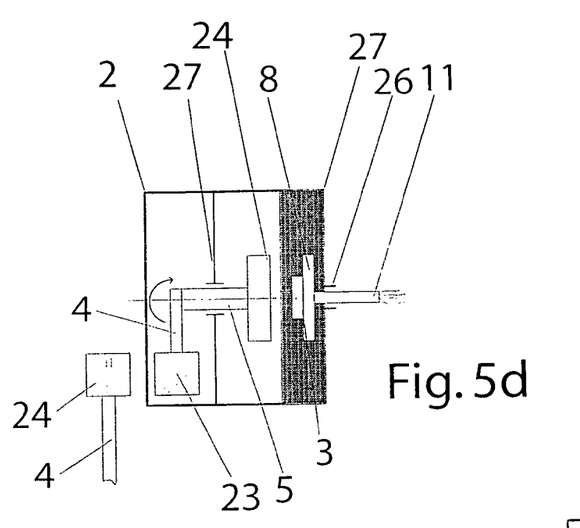
Figure 5E:
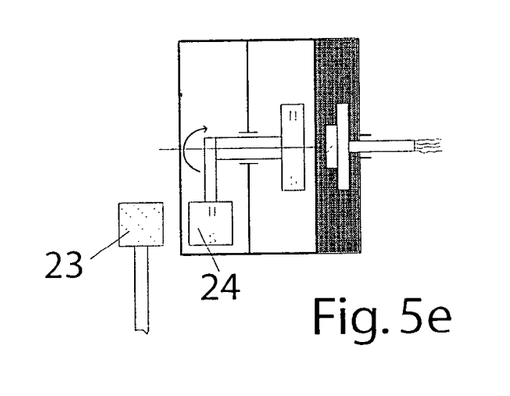
Figure 5F:
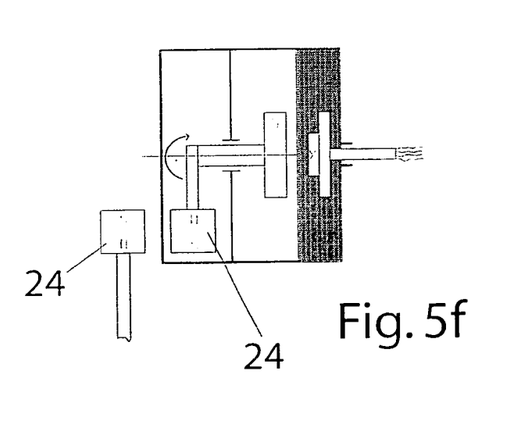
Figure 6A:
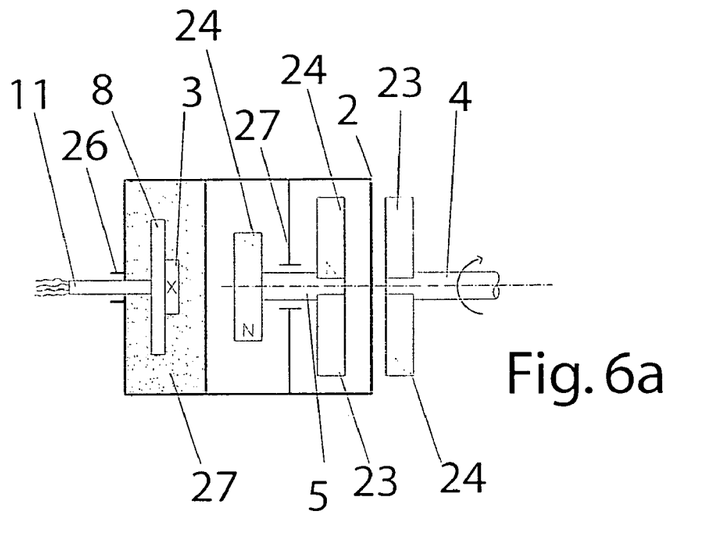
FIGS. 6a through 6c show solution in which a front face rotation indicator radially protrudes in both directions from a rotational axis.

In all of these, and in the additional FIGS. 5 through 7, intermediary element 5 is supported in housing 2 by a lateral wall 27 of the housing, on a bearing diameter, which is substantially smaller than the functional circles of input side 18, and of output side 19 of intermediary element 5.

The solutions of the FIG. 5 differ from those of the FIG. 4 in the fact that the now effective elements of rotation indicator 4 and input side 18 of intermediary element 5 oppose each other axially with a front wall 28 of housing 2 in between.

Thereby, again, only one functional element is located on input side 18 of the intermediary element, or on rotation indicator 4, where in one case, a stick magnet with radial pole direction with reference to rotational axis 17 is disposed, in the other case, a ferrite mass 23, or in both cases, a stick magnet 24 with radial pole direction, then however, with pole directions offset relative to each other by 180°. Thereby, in the solutions according to FIGS. 5a and 5d, the functional element on input side 18 of intermediary element 5 is a ferrite mass 23, which begins in FIG. 5a radially already on rotational axis 17, in FIG. 5d, however, radially further on the outside, while the rotation indicator includes a stick magnet in an analog axially opposed array.

On the other hand, in the solutions of FIGS. 5b and 5e on input side 18 of intermediary element 5, as a functional element a stick magnet 24 is provided with a radial pole direction, beginning in FIG. 5b radially directly on rotational axis 17, in FIG. 5e beginning radially further outside.

In both cases, on rotation indicator 4 a ferrite mass 23 is located as an effective element, on the other hand, FIGS. 5c and 5f differ in so far as a stick magnet 24 is also located here on rotation indicator 4 as an effective element with a radial pole direction offset by 180°.

Figure 6B:
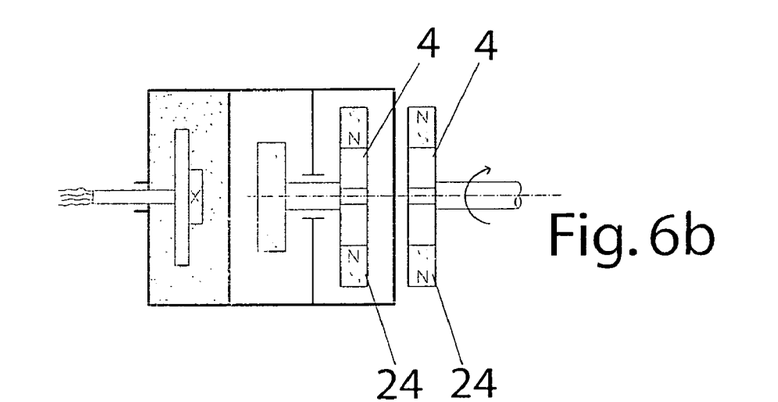
Figure 6C:
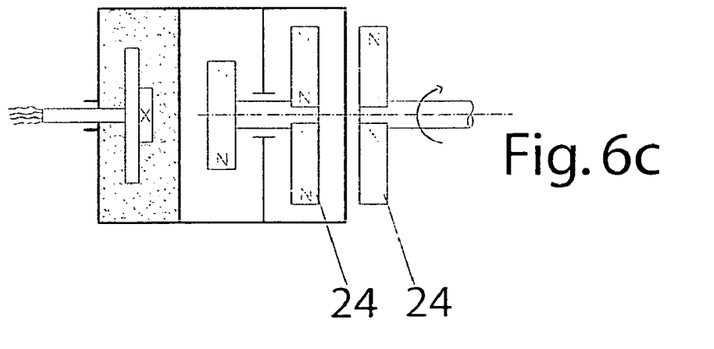

Opposed to FIGS. 4 and 5, the solutions of FIG. 6 show respective functional elements on the side of rotation indicator 4, as well as on input side 18 of intermediary element 5, opposing each other on both sides of rotational axis 17, either on the one side a stick magnet 24 with radial pole direction, and on the other side a ferrite mass 23, or on both sides a stick magnet 24, then with identical poles, either facing each other (FIG. 6b), or with different poles facing each other (FIG. 6c).

Opposed to the front face, a magnet is located, either a ferrite mass 23, or also a stick magnet 24, however, with a pole direction rotated by 180° so that a south pole is always opposed by a north pole of the other component, this means opposed to the rotation indicator or input side 18 of intermediary element 5, or at least a ferrite mass 23.

FIG. 7 shows solutions, which like FIGS. 4 and 5 on the side of rotation indicator 4, on the one hand, and on input side 18 of intermediary element 5, on the other hand, each only carry one functional element which, however, extends laterally across rotational axis 17, thus, in case of magnet 24, with both poles on different sides of rotational axis 17.

Figure 7A:
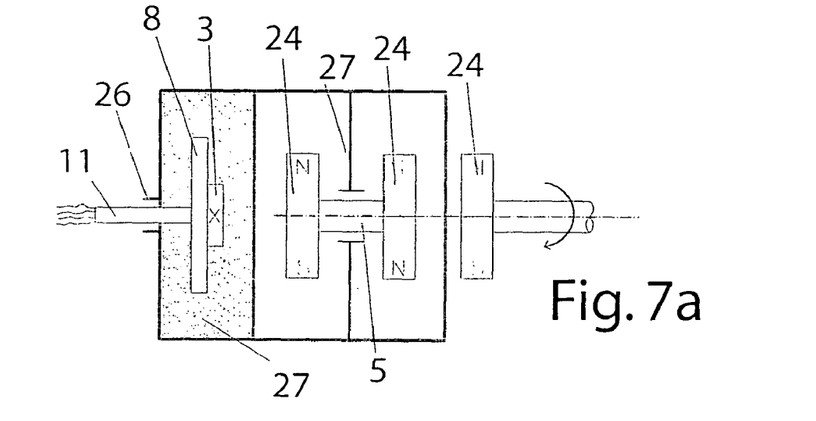
FIGS. 7a through 7c solutions in which the pole direction extends in lateral direction across a rotational axis.
Figure 7B:
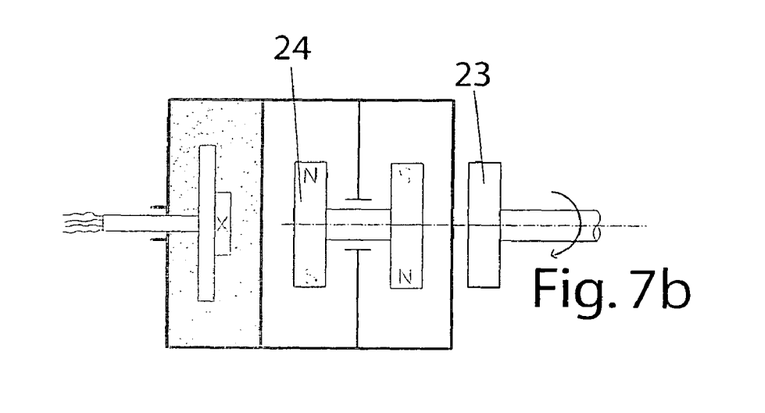
Figure 7C:
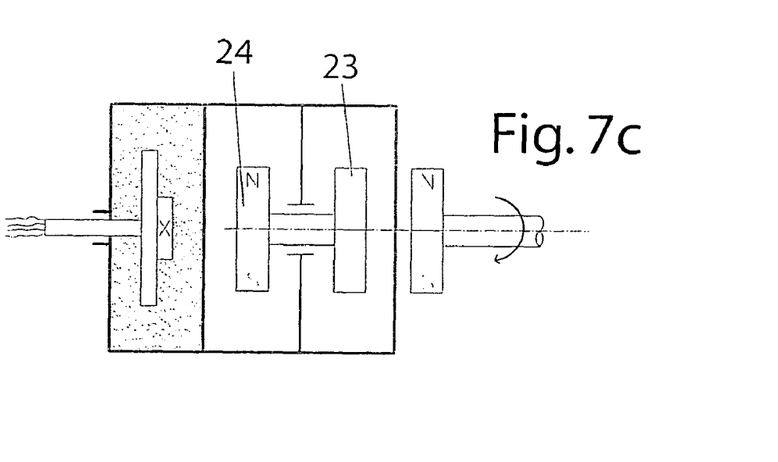

In FIG. 7b, this is the case on input side 18, in FIG. 7c, on the side of rotation indicator 4, while in FIG. 7a both sides comprise a stick magnet, however, with pole directions offset by 180°, so that the south pole is located here opposite to the north pole and vice versa.

In all cases, the chamber of housing 2, in which intermediary element 5 is located, is sealed relative to the space in which sensor element 3 is located.

Intermediary element 5 is mechanically supported in a bearing block provided in the interior of housing 2, e.g. in a lateral wall of the housing, either through a roller bearing or a through straight bearing.

Another possibility is to provide this bearing ferro-fluidic so that either the bearing block or the shaft to be supported of intermediary element 5 is provided magnetic. This holding magnet therefore holds the ferro-fluid as a sliding layer in the bearing gap, due to the ferrite particles contained in the ferro-fluid. Such a ferro-fluid is offered, e.g., by the companies Ferrofluidix, USA and Ferrotech, USA. This is the preferred form of bearing support since it has very little friction and, thereby, the function of the rotation angle sensor is already assured with minimal deflections and rotation speeds.

Figure 9:
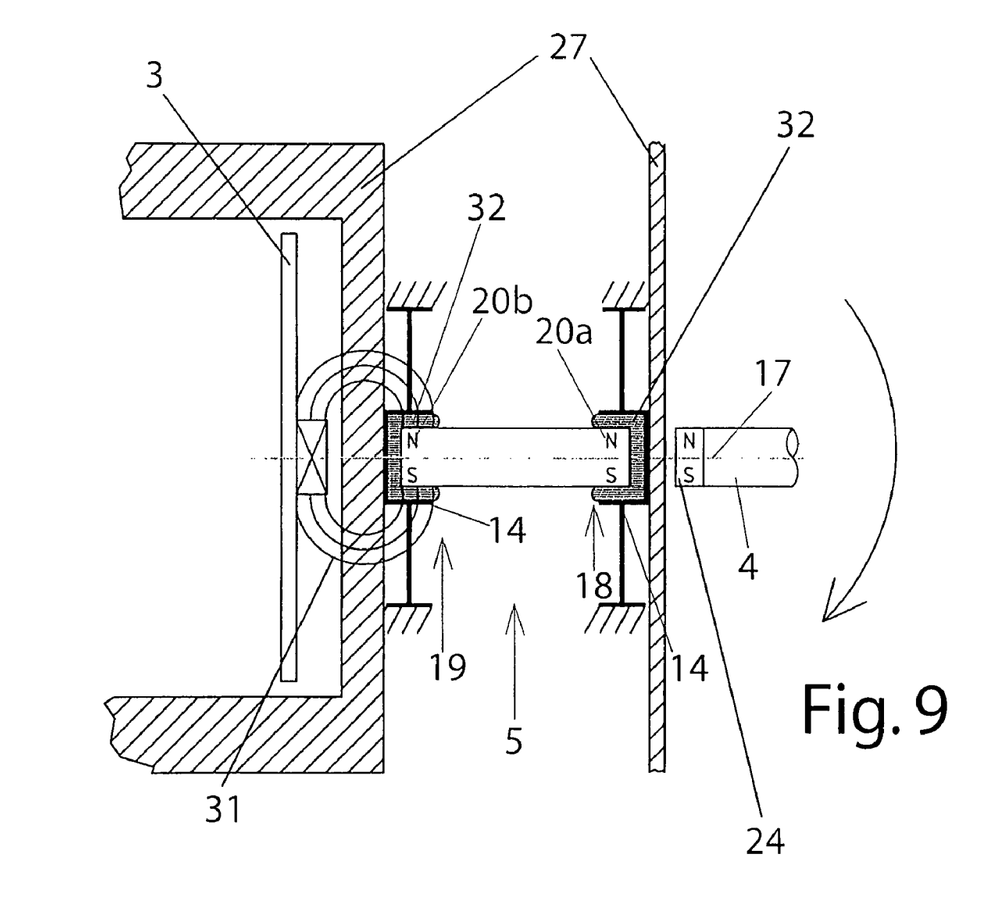
FIG. 9 illustrates a solution with an intermediary element supported in a ferro-fluidic bearing.

FIG. 9 shows a ferro-fluidic bearing of intermediary element 5 in this construction, which, in this case, is axially supported between two lateral walls 27. Wherein on the front face behind one lateral wall, rotation indicator 4 acts upon intermediary element 5, having on its front face a stick magnet 24 with a pole direction diametrically aligned to the rotation axis 17. While on the other side behind lateral wall 27, sensor element 3 is located which is preferably located on a printed circuit board 8.

Intermediary element 5 comprises at its end, this means on input side 18 and on output side 19, a shaft supported in one bearing 14 each which is thereby rotatable around rotational axis 17.

Bearing 14 comprises one bearing block each, each of which surrounds an end area of the shaft shaped intermediary element 5, radially and axially with a bearing gap in between which is filled with a ferro-fluid 32.

Ferro-fluid 32 attaches to the radial circumferential surfaces in the end areas, as well as on the axial front faces of the cylindrical intermediary element 5, since its front faces are provided as magnetic areas 20a, b, also provided with a diagonally extending pole axis, attracting ferro-fluid 32 due to the ferro-magnetic particles contained therein.

These magnetic areas 20a, b thus act as holding magnets for ferro-fluid 32, but, on the other hand and at the same time, on input side 18, as a torque transferring magnet relative to housing 4, and on output side 19, as a magnet impacting sensor element 3 through the non-magnetic wall 27.

Certainly, in a ferro-fluidic bearing of intermediary element 5, the holding magnets can be provided separate from the functional magnets.

FIG. 8, on the other hand, shows solutions in which intermediary element 5 is supported in housing 2, swimming on a fluid provided in a respective chamber of housing 2 as a float 25, so that also here no mechanical support is provided unless float 25 touches the interior wall of housing 2, wherein the mechanical friction is reduced to a minimum through the protruding rises or knobs 26 of the float.

In order for float 25 to maintain a stable position, the float is provided large enough so that it only has a small ability to move, other than rotation, in its chamber in the interior of housing 2.

Preferably, float 25 is provided stick-shaped in a chamber with circular cross section and extends through almost the entire diameter of the chamber.

Figure 8A:
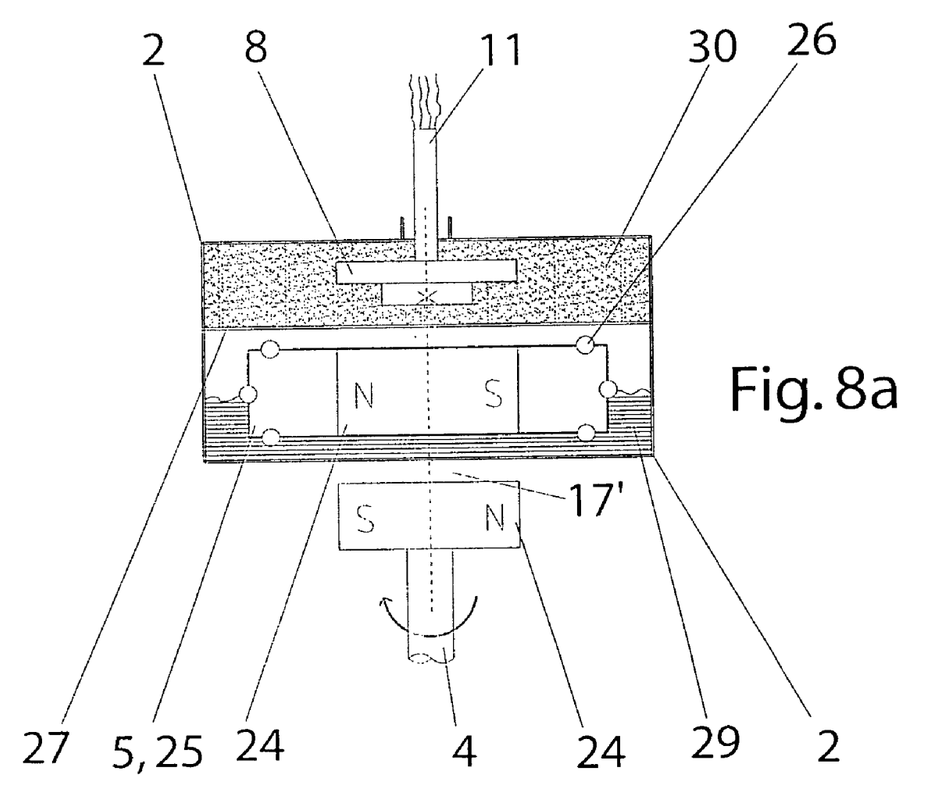
FIGS. 8a through 8c show solutions wherein an intermediary element is provided as a float.
Figure 8B:
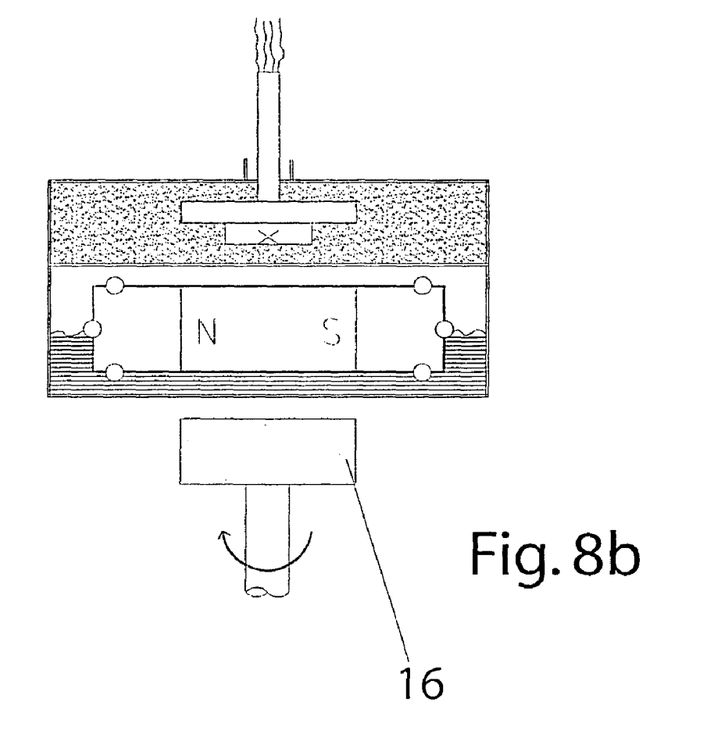

Thereby, in the solutions of FIGS. 8a and 8b, float 25 includes a stick magnet 24 having a pole direction extending parallel to the fluid level in longitudinal direction of stick-shape float 25, thereby simultaneously representing the magnetic input side 18, and also output side 19 of the intermediary element 5.

In case of FIG. 8a, as a functional element on rotation generator 4, also an opposing stick magnet 24 is located, however, with a pole direction offset by 180°, as magnet 24 of float 25 centrally located relative to rotational axis 17.

In FIG. 8, however, a ferrite mass 26 is disposed as a functional element, extending laterally across rotational axis 17' of rotation indicator 4.

Figure 8C:
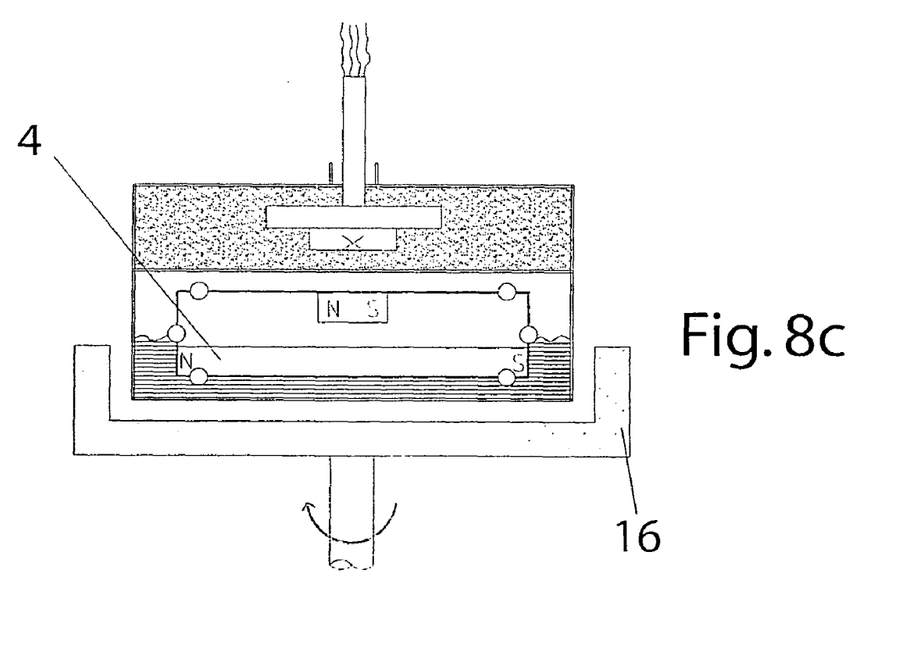

In the solution according to FIG. 8c, in float 25, input side 18 and output side 19 is provided with separate stick magnets 24 symmetrically extending across rotational axis 17, however, with different lengths, with a length of magnet 24 on input side 18 being shimmed much more, in particular, with a multiple of a length of magnet 24 on output side 19.

The effective element on the side of rotation indicator 4 is also a ferrite mass 23, thereby extending like a shell not only relative to the front face, but partially also on the outside around the circumferential surface of housing 2, thus, up to the axial position of the input side magnet 24 of float 25.

In all three cases, pivotal axis 17 is disposed vertically, this means, perpendicular to the fluid level on which float 25 floats. The sensor 3 is encased in its chamber preferably through an encasement material 30.

What is claimed is:

1. A rotation angle sensor (1), said sensor comprising:
   a housing (2);
   a sensor element (3) located in the interior of the housing (2);
   a rotation indicator (4), located outside of the sensor housing (2a), so it can rotate, and coupled with the sensor element (3), so it operates in a non-contacting manner through the wall of the housing (2); and
   an intermediary element (5) being rotationally supported in the interior of the housing (2) between the sensor element (3) and the rotation indicator (4), and being coupled to the rotation indicator (4) in a rotationally fixated, but non contacting manner, wherein the sensor element (3) is fixed in the housing (2) in a non-rotatable, spatially exactly defined position relative to the intermediary element (5), and
   the sensor element (3) is a magnetic sensor being coupled to the intermediary element (5) in a non-contacting manner by means of magnetic interaction
   wherein the intermediary element (5) is supported in the housing (2), whereby it floats on a fluid within the tight housing (2) as a float (25), and the pivot axis (17) is vertically disposed.

2. A rotation angle sensor according to claim 1 where on the outside of the housing (2) and on the rotation indicator (4) a marker (21) for the zero position is provided.

3. A rotation angle sensor according to claim 1 wherein said housing (2) is closed tight.

4. A rotation angle sensor according to claim 1 wherein said sensor element (3) is provided as an integrated sensor element (6) provided as an IC.

5. A rotation angle sensor according to claim 1 wherein at the intermediary element (5) and at the rotation indicator (4), a marker (21') for the zero position is provided, and the housing (2) has a sight window for detecting the marker (21) at the intermediary element (5).

6. A rotation angle sensor according to claim 1 wherein said rotation indicator (4) and/or said intermediary element (5) operate through induction, magnetism or radiation in a non-contacting manner through the housing (2).

7. A rotation angle sensor according to claim 1 wherein among a magnetic rotation indicator (4) and/or intermediary element (5), at least one of them is magnetized in an alternating, varied manner in circumferential direction, and the wall of the housing (2), through which a non-contacting rotation coupling is performed, is made from non magnetizable material.

8. A rotation angle sensor according to claim 1 wherein on said intermediary element (5), the pole axis, thus the varied magnetization is disposed in circumferential direction, or in a radial manner relative to the pivot axis (17).

9. A rotation angle sensor according to claim 1 wherein said intermediary element (5) close to its exterior circumference is rotationally supported in said housing (2), directly abutting to a wall of said housing (2) through which the non-contacting, rotationally fixed coupling with said rotation indicator (4) is to be performed.

10. A rotation angle sensor according to claim 1 wherein on said intermediary element (5), on its entry side (18), facing the rotation indicator (4), the sections (20a, b) with various magnetization are located in a circle with substantially larger diameter than on an exit side (19).

11. A rotation angle sensor according to claim 10 wherein the functional diameter of the circle on the entrance side (18) is at least 3 times, better at least 5 times the diameter on the exit side (19), and at least 3 cm, and at least 5 cm.

12. A rotation angle sensor according to claim 1 wherein during a magnetic functional connection between said rotation indicator (4) and said intermediary element (5), either the rotation indicator (4), or the input side (18) of said intermediary element (5), is magnetized in a varied alternating manner, and the respective other part comprises a ferrite mass (23), which is disposed non-symmetrical relative to the rotation axis, or both parts are magnetized in a varied alternating manner, so that the rotation indicator entrains the input side of the intermediary clement (5).

13. A rotation angle sensor according to claim 1 wherein said rotation indicator (4) and the intermediary clement (5) are rotatable around a rotation axis (17), which is substantially coincides.

14. A rotation angle sensor according to claim 12 wherein the ferrite mass (23), or an indicator magnet (24) of the rotation indicator (4) reach around the sensor housing (2) at the axial position of the input side (18) of the intermediary element (5), radially on the outside, in particular around its housing.

15. A rotation angle sensor according to claim 12 wherein the ferrite mass (23) or an indicator magnet (24) of the rotation indicator (4) reach around the sensor housing (2) at the radial position of the input side (18) of the intermediary element (5), relative to its front face in an opposing manner.

16. A rotation angle sensor according to claim 1 wherein the intermediary element (5) is supported at an axial position between the input side (18) and the output side (19) of the intermediary element (5) in the housing (2), on a diameter which is smaller than the functional circles on the output side (19) as well as on the input side (18).

17. A rotation angle sensor according to claim 1 wherein the intermediary element (5) is supported in the housing (2) with the larger outside diameter of the input side (18), and the input side (18) is therefore provided as a circular disk shape.

18. A rotation angle sensor according to claim 1 wherein in case of a radial pole direction on the input side (18) of the intermediary element (5), only a stick magnet (24) is disposed extending laterally across the rotation axis (17), and the rotation indicator (4) includes an analogously disposed stick magnet (24), rotated by 180° with respect to its pole direction so that the south pole of the rotation indicator and the north pole of the intermediary element oppose each other or the rotation indicator comprises a symmetrically disposed ferrite mass.

19. A rotation angle sensor according to claim 1 wherein the input side (18) of the intermediary element (5) or the rotation indicator (4) exclusively comprise a ferrite mass (23).

20. A rotation angle sensor according to claim 1 wherein the pole axis of the float (25) is disposed in parallel to the fluid level.

21. A rotation angle sensor according to claim 1 wherein said float (25) only has marginally smaller dimensions than the interior of the surrounding housing (2).

22. A rotation angle sensor according to claim 1 wherein the sensor element (3), the integrated sensor element (6), and the other electronic components located on the same printed circuit board, are encased in the housing (2).

23. A rotation angle sensor according to claim 1 wherein the housing (2) is a round housing with a cover (7), and an open side of housing (2) is located on the side facing away from the rotation indicator (4).

24. A rotation angle sensor according to claim 23 wherein the open side of the housing (2) is closed tight through a cover (7) inserted into the interior circumference and fixed with a snap ring or bolted down.

25. A rotation angle sensor according to claim 23 wherein said cover (7) allows either a signal pass through via cable and cable grommet, or via cable connector, or without cable through non contacting signal passage to the outside.

26. A rotation angle sensor according to claim 23 a radial cable exit (11) is directly run out of the side surface of the housing, or on the outside of the cover (7) a radially angulated cable exit is located.

27. A rotation angle sensor according to claim 23 wherein the rotation angle sensor has a cable adapter which can be mounted to the cover (7) which causes a deflection of the cable axially run out, into a radial exit direction.

28. A rotation angle sensor according to claim 1 wherein said housing (2) has a groove (9) at its particularly round outer circumference, on at least 2 opposing sides, in particularly annular circumferential for mounting relative to the surroundings.

29. A rotation angle sensor according to claim 1 wherein the magnetic rotation indicator (4) and/or the intermediary element (5) generate field lines, extending in a plane including their rotation axis (17), substantially symmetrical to the rotation axis (17) and the magnetostrictive sensor element (3), which is located on the extension of the rotation axis (17), and has sensor elements, offset relative to each other in circumferential direction, which are connected in a bridge array.

30. A rotation angle sensor according to claim 29 wherein the field lines generated by the rotation indicator (4) and/or the intermediary element (5) extend non symmetrical relative to the rotation axis (17), and the magnetostrictive sensor element (3), which is located on the extension of the rotation axis (17), can sense differences in the field lines on the opposing sides of the rotation axis (17).

31. A rotation angle sensor according to claim 1 wherein the magnetic rotator indicator (4) and/or the intermediary element (5) comprise one or several permanent magnets.

32. A rotation angle sensor (1), said sensor comprising:
a housing (2);
a sensor element (3) located in the interior of the housing (2);
a rotation indicator (4), located outside of the sensor housing (2a), so it can rotate, and coupled with the sensor element (3), so it operates in a non-contacting manner through the wall of the housing (2); and
an intermediary element (5) being rotationally supported in the interior of the housing (2) between the sensor element (3) and the rotation indicator (4), and being coupled to the rotation indicator (4) in a rotationally fixated, but non contacting manner, wherein
the sensor element (3) is fixed in the housing (2) in a non-rotatable, spatially exactly defined position relative to the intermediary element (5), and
the sensor element (3) is a magnetic sensor being coupled to the intermediary element (5) in a non-contacting manner by means of magnetic interaction wherein the input side (18) of the intermediary element (5) includes one or several stick magnets (24) which are each located only on one side of the rotation axis and all of them face the rotation axis with the same pole, and only at one stick magnet (24), a ferrite mass (23) is disposed opposite to the stick magnet.

33. A rotation angle sensor according to claim 32 wherein the rotation indicator (4) includes, at the rotation positions, at which the input side (18) of the intermediary element (5) comprises a stick magnet (24) or the ferrite mass (23), a ferrite mass or a stick magnet with an analog pole direction, rotated by 180°, so that south poles of the magnet (24) of one component face a north pole or a ferrite mass (23) of the other component.

34. A rotation angle sensor (1), said sensor comprising:
a housing (2);
a sensor element (3) located in the interior of the housing (2);
a rotation indicator (4), located outside of the sensor housing (2a), so it can rotate, and coupled with the sensor element (3), so it operates in a non-contacting manner through the wall of the housing (2); and
an intermediary clement (5) being rotationally supported in the interior of the housing (2) between the sensor element (3) and the rotation indicator (4), and being coupled to the rotation indicator (4) in a rotationally fixated, but non contacting manner, wherein the sensor element (3) is fixed in the housing (2) in a non-rotatable, spatially exactly defined position relative to the intermediary element (5), and
the sensor element (3) is a magnetic sensor being coupled to the intermediary element (5) in a non-contacting manner by means of magnetic interaction wherein said intermediary element (5) is supported in a ferro-fluidic bearing in the housing (2), whereby either the bearing of the intermediary element (5), or the surrounding bearing block is provided magnetic in the housing, and a ferrofluid containing ferrite particles is thereby magnetically accumulated in the bearing gap.

* * * * *